W. P. LOTZ.
BORING MACHINE.
APPLICATION FILED FEB. 3, 1921.
1,422,456.
Patented July 11, 1922.
3 SHEETS—SHEET 1.
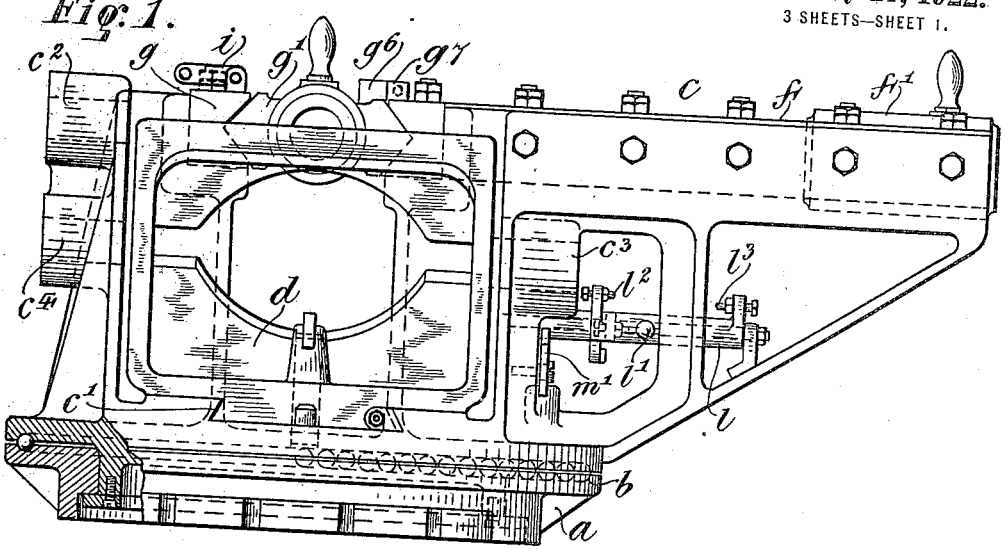
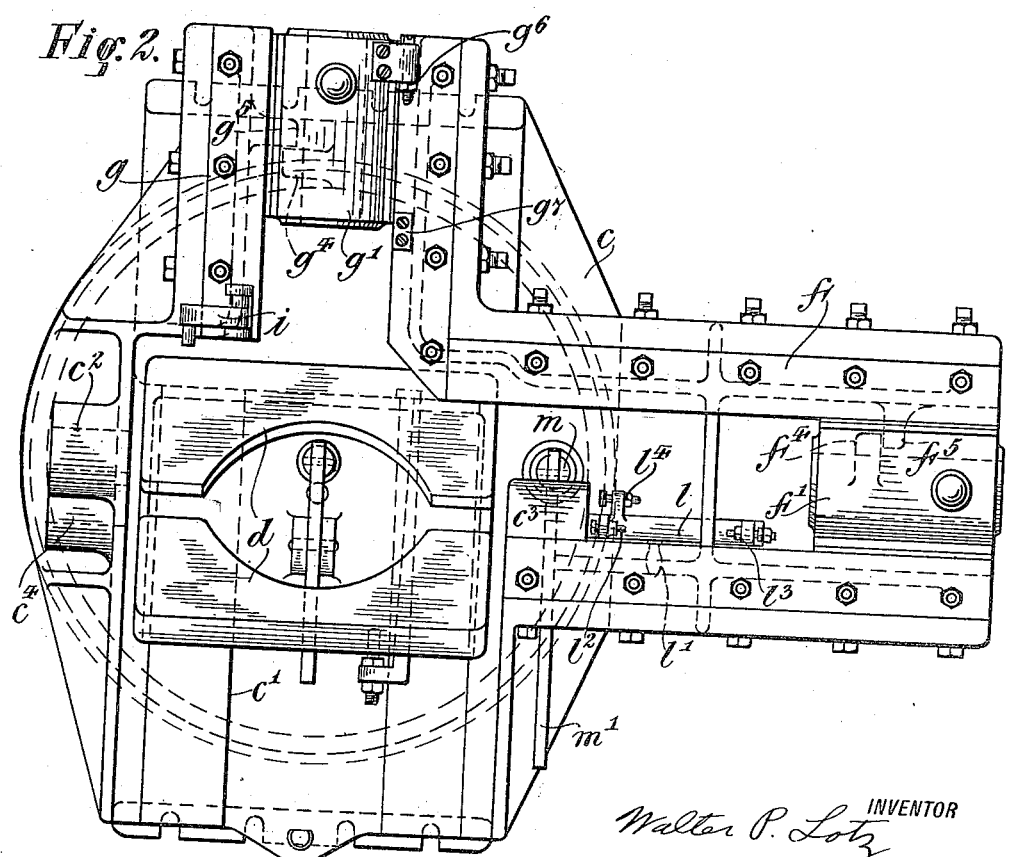
Walter P. Lotz INVENTOR
BY
Redding & Greeley
ATTORNEYS

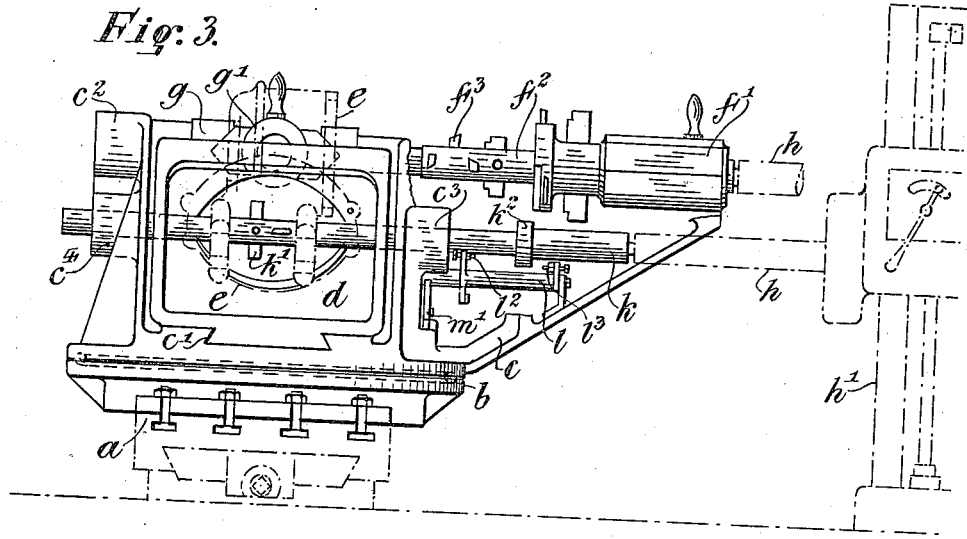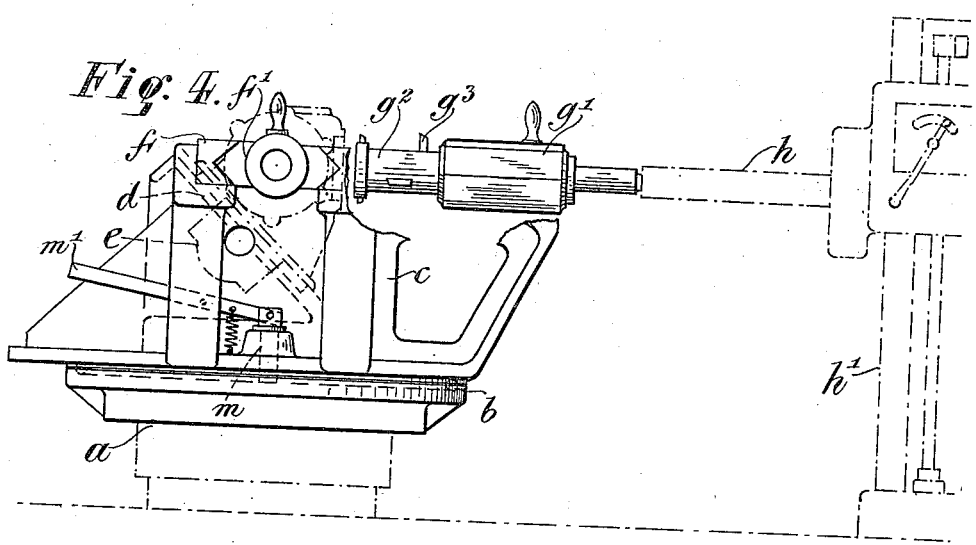

UNITED STATES PATENT OFFICE.

WALTER P. LOTZ, OF NEW BRUNSWICK, NEW JERSEY, ASSIGNOR TO INTERNATIONAL MOTOR COMPANY, OF NEW YORK, N. Y., A CORPORATION OF DELAWARE.

BORING MACHINE.

1,422,456.     Specification of Letters Patent.     Patented July 11, 1922.

Application filed February 3, 1921. Serial No. 442,185.

*To all whom it may concern:*

Be it known that I, WALTER P. LOTZ, a citizen of the United States, residing in the city of New Brunswick, in the State of New Jersey, have invented certain new and useful Improvements in Boring Machines, of which the following is a specification, reference being had to the accompanying drawings, forming a part hereof.

This invention relates generally to boring machines and is concerned particularly with a fixture for line boring and reaming with a single bar. Heretofore, in machines for this purpose the bar has been passed through the work manually and supported rotatably in bushings, one at least of which has needed to be removed at each operation to permit the withdrawal of the bar endwise with the tools carried thereon. In relatively heavy work, as in the boring of cases for gears in the automobile industry two men are required to handle the bar and work. Further, certainty of alinement of holes bored on axes angularly disposed or offset has never been accomplished since after each boring operation either the bar or the work has been changed in its setting and the human factor has entered into the job to such a degree as to prevent absolute accuracy. Further, the operations involved have been tedious and time-consuming, the production has been low and the net expense of bored cases has been much greater than is possible by the improved machine. In addition to speeding up the operations the present machine is automatic in a sense in that the boring bars and work are initially set in fixed relation and this relationship is maintained until all the work is completed. Roughing, finishing and reaming are completed in a floor-to-floor operation. The machine has special utility where it is required that holes be bored in a case on axes which are at predetermined angularity with respect to one another and where the axes of sets of holes are to be offset at predetermined distances. In the improved machine the work and the bars are supported on a rotatable fixture which can be indexed in any desired position, the bars being connectible to the machine spindle for operation when the machine is properly indexed. None of the boring bars need to be removed from their supporting slides or bushings until all of the operations of the machine are completed. The setting of the parts and manipulations are readily accomplished by a single attendant whose work is carried on quickly and easily and whose skill plays little part in the accuracy of the operations performed. Another feature of the invention which is of importance resides in the provision of selector mechanism for limiting automatically the travel of the boring and facing tools whereby the same bar with the same tools can be employed where the depth of the cut varies. In this mechanism series of stops are carried on a rock shaft and are movable selectively by the operator into operative relation to the bar which is adapted to engage the stop at its predetermined limit of travel.

The features of the invention outlined briefly in principle in this preamble will be described in some detail in connection with the illustrated embodiment in the drawing, wherein—

Figure 1 is a view in side elevation of the improved fixture with the boring bars removed.

Figure 2 is a view in plan of the fixture shown in Figure 1.

Figure 3 is a view in side elevation of the improved fixture showing the relation of the boring bars, work and associated parts of the conventional type of boring machine.

Figure 4 is a view in elevation showing the fixture of Figure 3 indexed through an angle of 90°.

Figure 5:
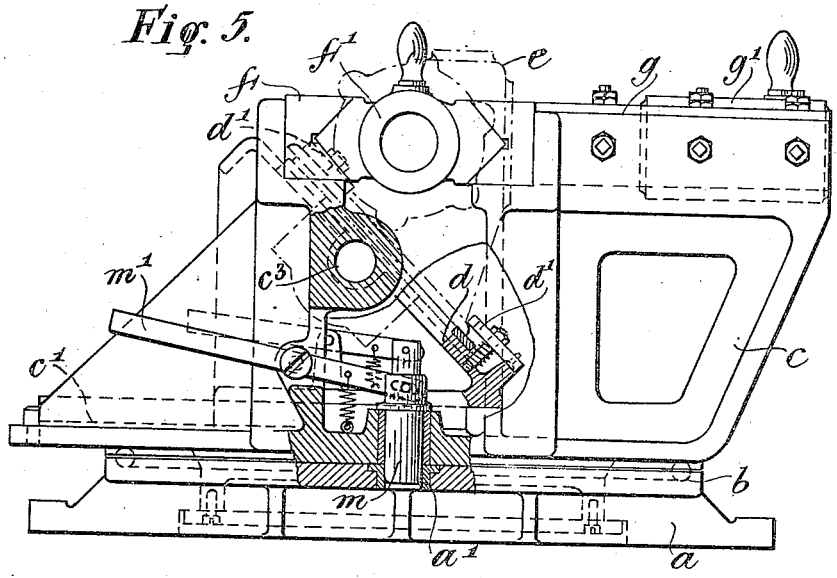
Figure 5 is a view in elevation of the improved fixture, parts being broken way to show details of the work support and the holding dog.
Figure 6:
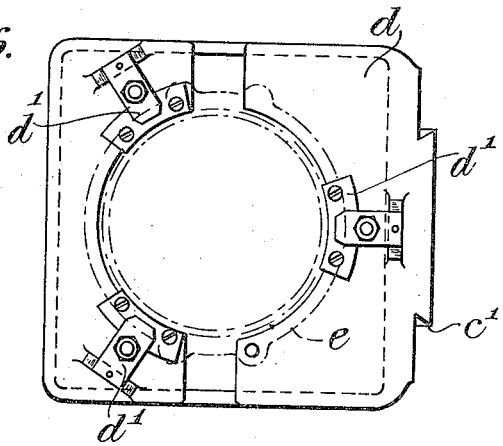
Figure 6 is a detail view in plan of the work support.

The embodiment illustrated herein relates to the application of the improved devices to a boring machine having a horizontal spindle and adapted to operate on cases for gears to be used in the automobile art. As the description proceeds, however, it will be apparent to the skilled mechanic that the same principles might readily be embodied in a structure applicable to boring machines or drilling machines of other forms and operating on work of different character. With this in mind reference is to be had to the table *a* of a boring machine on which is supported, as through a ball-race $b$, the revoluble fixture $c$ in which are incorporated all of the improvements. This fixture carries a work support $d$ which may be slidably mounted in ways $c'$ of the fixture. The invention is not concerned with the form of this work support, although as shown in Figures 5 and 6 it has associated with it clamping elements $d'$ which are releasably engaged with the work, the outline of which appears in dotted lines at $e$. On the gear case, represented at $e$, it is proposed to perform several different boring operations while the work is clamped in place on the work support $d$, these operations including the roughing, finishing and reaming of sets of holes in its side walls on axes, two of which are at right angles to one another and two of which, while parallel, are offset with respect to one another. As to each set of holes, it is proposed to carry on the roughing, finishing and reaming operations successively, these operations being also performed simultaneously in those instances where there are two or more alined openings through which the bar extends. As shown in the drawings, there are provided two sets of ways $f$, $g$, disposed at right angles to each other and in these ways are slidably mounted slides $f'$, $g'$, respectively, in which the boring bars $f^2$, $g^2$ may be clamped. These boring bars $f^2$, $g^2$ each carry suitable roughing, finishing and reaming tools, indicated generally at $f^3$, $g^3$, and may be connected to the revolving spindle $h$ of the boring machine $h'$ when the fixture $c$ is revolved to index the respective bars in alinement with said spindle. Various stops and gages are associated with the fixture to guide the attendant in his control of the parts. For instance, Figure 2 shows most plainly a swiveled gage element $i$ which is mounted on the fixture at such point as will indicate the correct position of the work when clamped on the support $d$. One wall of the case to be bored may engage the gage element $i$. In like manner it will be seen that the slide $g'$ has an abutment $g^4$ which co-operates with an abutment $g^5$ in the way $g$ to limit the retraction of the slide $g'$. The slide $f'$ has a similar abutment $f^4$ which co-operates with a similar abutment $f^5$ in the way $f$. The inward travel of the slide $g'$ may be gaged by an adjustable stop $g^6$ carried thereon and adapted to co-operate with an abutment $g^7$ mounted in the way $g$. For the purposes of this specification the case to be bored has been shown as having only one hole in one side wall to be formed by the bar $g^2$ while two holes in alinment are to be formed by the bar $f^2$. Since it is proposed that the two last named alined holes shall have the corresponding operations carried on simultaneously, the bar $f^2$ has the various tools duplicated for association with the respective openings and an end bearing $c^2$ is formed on the fixture $c$ to receive slidably the end of the bar $f^2$ and support it in alinement with the slide $f'$.

In so far as the machine has been described, its advantages can be appreciated even without the additional provisions to be hereinafter described. After the work has been clamped on the support $d$ the fixture $c$ can be so positioned as to aline one of the bars $f^2$, $g^2$ with the revolving spindle $h$ of the machine $h'$. The spindle and alined bar are connected. During the operation its tools are fed by any approved means until the roughing, finishing and reaming have been completed. The bar is then retracted with its tools, disengaged from the spindle $h$ and the fixture $c$ revolved through an angle of 90°, or any other predetermined number of degrees, when it is clamped in place with the other bar $f^2$, or $g^2$, alined for connection with the spindle $h$. The indexing described may be conveniently accomplished by means of a reciprocable dog $m$ mounted in the fixture $c$ and adapted to engage in the predetermined positions of the fixture openings $a'$ formed in the bed $a$ of the machine. This dog may be operated conveniently by means of a spring pressed lever $m'$ pivoted on the fixture $c$ and disposed within convenient reach of the operator. By reciprocating the dog $m$ the fixture $c$ may be revolved on its bearings $b$ until the dog $m$ has been brought in alinement with the proper opening $a'$ provided therefor. It may then be snapped into this opening thereby locking the fixture against further movement. All of the operations are carried on without changing the work and by means of bars which are carried on slides moving in ways having a predetermined and unalterable relationship. This assures that the holes will be bored on all cases on axes which have the same predetermined angularity with respect to one another. It enables the successive operations to be carried on by a single attendant after a very simple indexing manipulation of the fixture and connection of the proper bar with the revolving spindle.

In some gear cases it is desirable to bore a hole or a set of holes on an axis parallel but offset from the axis of other holes in the case. Provision is made in the illustrated embodiment of the improved machine for carrying on the necessary boring operations for offset holes with the same facility and accuracy of work as is accomplished where the axes of the holes are angularly disposed.

Referring now to Figure 3 it appears that a third boring bar $k$ is journaled in the fixture $c$ with its axes substantially parallel to that of the boring bar $f^2$ but displaced with relation therewith. This boring bar may be mounted slidably in a bearing $c^3$ provided therefor on the fixture $c$ and rest in an end bearing $c^4$ which holds the end of the bar with stability against end motion. On the bar are mounted a series of suitable tools indicated generally at $k'$. The bar $k$ may be connected by the attendant to the revolving spindle $h$ of the machine $h'$ by proper manipulation of the movable head of the machine to bring the spindle in alinement with the bar when the latter is properly presented thereto. From this description it appears clear that the bar $k$ is mounted reciprocably in fixed relation to both of the bars $f^2$, $g^2$ so that the holes formed in the case by the tools on the bar $k$ will be in exact predetermined relation to all of the holes formed with the first named bars.

To illustrate another feature of the invention whereby the travel of any one tool may be limited automatically, the improved selector mechanism has been illustrated in association with the boring bar $k$ although it will be clear that there is no limitation on the support of use of the selector mechanism to be described.

This mechanism has for its general purpose to enable the operator to place any one of several stops in operative relation to the traveling bar so as to arrest the movement of that bar at a predetermined point. This stoppage or control increases the speed of production since it makes it unnecessary for the operator constantly to gage the depth of a cut. The improved selector mechanism is adaptable for limiting the travel of the bar in either direction and this is of particular importance in facing operations wherein the facing tools travel in opposite directions. The embodiment of the selector mechanism shown in the drawings includes a rock shaft $l$ mounted on the fixture $c$ and carrying a handle $l'$ for convenient adjustment. On this rock shaft are supported a pair of opposed and adjustable stops $l^2$, $l^3$ and a third stop $l^4$ offset angularly with respect to the first named stops and intended for use in limiting a particular cut. On the bar $k$ is formed or secured a flange $k^2$ into the path of which either the pair of opposed stops $l^2$, $l^3$ or the single stop $l^4$ may be thrown by rocking the shaft $l$. The stop $l^2$ limits the travel of the bar $k$ in one direction since when it is engaged by the flange $k^2$ the bar can travel no further. Contrariwise, the stop $l^3$ limits the extent of travel of the bar $k$ in the opposite direction. For a special cut the operator may rotate the rock shaft $l$ until the adjustable stop $l^4$ is brought into the path of the flange $k^2$ to arrest the movement of the cutting tool at a different point. This selector mechanism may obviously be adapted to different conditions of use and may include any number of stops on the rock shaft $l$ arranged in various relationships so as to take care of cuts of different depths and kinds.

The general aptitude of the features of the present invention have been indicated hereinbefore and it will be understood that the claims appended hereto while defining the relation of parts in a general way are to be construed with reference to the permissible departures indicated hereinbefore.

I claim as my invention:

1. In a machine for boring or the like, in combination with a power shaft, a revoluble fixture, a work support on the fixture, a plurality of reciprocable cutting tools mounted on the fixture in different horizontal planes and adapted to move in paths at an angle to each other, and means to index the fixtures for connection of any one of said tools with said power shaft, as selected.

2. In a machine for boring or the like, in combination with a power shaft, a revoluble fixture, having undercut ways in angular relation to each other, a work support carried on the fixture, slides mounted in said ways and adapted to support the tool bars and means to index said fixture with one or the other of said bars in position for operative connection to said power shaft.

3. In a boring machine, in combination with a bed and horizontal revolving spindle, a fixture revolubly mounted on the bed, said fixture having radial undercut ways supported in angular relation to one another, a work support on the fixture, slides mounted in said ways and adapted to support boring bars and means to index said fixture with one or the other of said boring bars alined with said spindle for connection thereto.

4. In a boring machine, in combination with a bed and a vertically reciprocable head provided with a rotatable spindle, a revoluble fixture mounted on the bed, having ways angularly disposed thereon, a work support on the fixture, slides mounted in the ways and supporting boring bars, a bearing on the fixture to support a third boring bar parallel to but offset from one of said first named bars, and means to index the fixture with any one of said bars in alinement with said spindle for connection thereto.

This specification signed this 31st day of January, A. D. 1921.

WALTER P. LOTZ.